US006570286B1

(12) United States Patent
Gabrys (10) Patent No.: US 6,570,286 B1
(45) Date of Patent: May 27, 2003

(54) FULL MAGNETIC BEARINGS WITH INCREASED LOAD CAPACITY

(75) Inventor: Christopher W. Gabrys, Reno, NV (US)

(73) Assignee: Indigo Energy, Inc., Napa, CA (US)

( * ) Notice: Subject to any disclaimer, the term of this patent is extended or adjusted under 35 U.S.C. 154(b) by 0 days.

(21) Appl. No.: 10/067,582

(22) Filed: Feb. 4, 2002

Related U.S. Application Data (60) Provisional application No. 60/266,175, filed on Feb. 3, 2001.

(51) Int. Cl.[7] ................................................ H02K 7/09
(52) U.S. Cl. ..................................................... 310/90.5
(58) Field of Search ......................... 310/90.5, 90, 166, 310/74; 74/572

(56) References Cited

U.S. PATENT DOCUMENTS

| | | | | |
|---|---|---|---|---|
| 3,565,495 A | | 2/1971 | Lyman | 370/90.5 |
| 3,954,310 A | | 5/1976 | Rava | 370/90.5 |
| 4,211,452 A | | 7/1980 | Poubeau | 370/90.5 |
| 4,471,331 A | * | 9/1984 | Wyatt | 335/285 |
| 4,645,961 A | | 2/1987 | Malsky | 310/268 |
| 4,818,905 A | | 4/1989 | Lender | 310/42 |
| 4,883,981 A | | 11/1989 | Gerfast | 310/40 |
| 4,937,485 A | | 6/1990 | Mihalko | 310/208 |
| 4,961,352 A | * | 10/1990 | Downer et al. | 74/5.46 |
| 5,126,610 A | | 6/1992 | Fremerey | 320/90.5 |
| 5,541,460 A | | 7/1996 | Dunfield et al. | 360/67 R |
| 6,069,424 A | | 5/2000 | Colello | 310/58 |
| 6,188,202 B1 | | 9/2000 | Pinkerton | 310/178 |
| 6,166,472 A | | 12/2000 | Pinkerton | 310/208 |
| 6,208,056 B1 | | 3/2001 | Perkins | 310/179 |
| 6,262,505 B1 | | 7/2001 | Hockney | 320/90.5 |
| 6,351,049 B1 | * | 2/2002 | Chassoulier et al. | 310/90.5 |
| 6,384,500 B1 | * | 5/2002 | Chassoulier et al. | 310/90.5 |

* cited by examiner

Primary Examiner—Dang Dinh Le
(74) Attorney, Agent, or Firm—J. Michael Neary (57) ABSTRACT

A full levitation magnetic bearing system with passive magnetic bearings that affords increased radial stiffness and load capacity includes two passive permanent magnet magnetic bearings, one each located on each side of the center of mass of the rotor to be levitated. An active axial magnetic bearing provides control for stable levitation. The magnetic bearing system provides increased radial stiffness and load capacity by the reduction or elimination of the unstable tilting moments generated by the individual passive permanent magnet magnetic bearings. The bearings are constructed so that they are concave toward the center of the rotor, with a radius approximately equal to the distance between the magnetic bearing and the central point about which tilt rotation would tend to occur. The individual magnetic air gaps are preferably constructed to be perpendicular to the axis of rotation.

8 Claims, 8 Drawing Sheets

FULL MAGNETIC BEARINGS WITH INCREASED LOAD CAPACITY

This relates to U.S. Provisional Application No. 60/266,175 entitled "Tilt Moment Instability Reduction Method" filed on Feb. 3, 2001.

This invention pertains to magnetic bearing systems, and more particularly to a full levitation bearing systems utilizing passive radial magnetic bearings. The invention provides significantly increased radial load capacity without requiring additional magnets by reduction or elimination of unstable tilting moments generated by the individual passive permanent magnet bearings. In some cases, the invention permits stable levitation where it was not previously achievable and in other cases, the amount of magnet material required to achieve a desired radial bearing stiffness can be reduced, reducing size and costs.

BACKGROUND OF THE INVENTION

Magnetic bearings are used in many applications for the benefits of long term, reliable operation, high-speed capability and low friction. Whenever possible, it is usually desirable to use passive radial magnetic bearings as opposed to active radial magnetic bearings because of much simpler, lower cost and more reliable construction. Passive radial magnetic bearings generate radial centering stiffness by the interaction of permanent magnets and sometimes with ferromagnetic poles. Because the centering force is provided passively, high frequency control electronics are not required. In a full levitation system, passive radial magnetic bearings can be located on opposite ends of a rotor and a single axial actively controlled magnetic bearing is all that is required for levitation.

Unfortunately, passive radial magnetic bearings usually provide only very low radial stiffnesses and load capacities. This characteristic property can hinder their implementation in some applications and can reduce performance when utilized in others. The low radial load capacity can require some devices that operate only vertically, so as to reduce the radial loads on the magnetic bearings, to have a small allowable tilt angle. To overcome the deficiencies of low radial stiffness and load capacity with passive radial magnetic bearings, designers have made the radial magnetic bearings larger, utilizing more magnet material to increase performance. Such solutions increase both the size and weight and also increase the cost of the magnetic bearings.

Unstable tilt moments occur in magnetic bearing systems because of a change in air gaps of the magnetic bearings when a tilt perturbation occurs. These unstable tilt moments are undesirable effects that are generated by individual passive magnetic bearings. When individual radial permanent magnet bearings are combined to provide a full levitation magnetic bearing system, the unstable tilt moments of individual bearings combine to reduce the radial stiffness and radial load capacity of the full system. The stable forces of other axes must overcome the unstable tilt moments to achieve a stable complete levitation. The radial stabilizing forces at one end of the rotor multiplied by the distance between the ends of the levitated rotor must be made larger than the unstable tilting moment of the opposite end. For this reason in disk type rotors, the unstable tilt moments can be very difficult to overcome due to the short distance between the passive radial magnetic bearings. Because the unstable tilt moment generated by a permanent magnet bearing is usually related to its diameter, one method for reduction of tilt moment forces is to make the magnetic bearings radially small in diameter. Unfortunately, this is not always possible because in many cases the desired large axial and/or radial forces require large magnetic bearing surface areas. The magnetic bearings could alternatively be distributed between multiple small diameter assemblies along the shafts. Unfortunately, this tends to generate unacceptably low flexural critical frequencies as well as large size and high costs.

One promising application for full levitation magnetic bearing systems utilizing passive radial magnetic bearings is in flywheel energy storage devices. These devices store and resupply energy as an alternative to conventional batteries, with the advantages of higher reliability, lower maintenance, known energy stored, temperature insensitivity and higher power capability. Flywheel energy storage devices include a high speed flywheel that rotates inside an evacuated container for elimination of aerodynamic drag. The flywheel has an attached motor/generator that accelerates and decelerates the flywheel for storing and retrieving energy. The flywheels are expected to rotate continuously at high speed for years, making the use of magnetic bearings very desirable. Because the flywheels rotate only to store energy, the bearing system need not have high radial loads applied. In many flywheel devices, the flywheels are made to rotate about a vertical axis, which further reduces radial bearing loading. However, because the flywheel can weigh as much as several hundred pounds for storing large amounts of energy, the bearings can still experience radial loading from the orientation axis being tilted slightly from vertical when the unit is installed.

SUMMARY OF THE INVENTION

The invention provides a full levitation magnetic bearing system with passive magnetic bearings that affords increased radial stiffness and load capacity. The magnetic bearing system uses two passive permanent magnet magnetic bearings, one each located on each side of the center of mass of the rotor to be levitated. An active axial magnetic bearing provides control for stable levitation. The magnetic bearing system provides increased radial stiffness and load capacity by the reduction or elimination of the unstable tilting moments generated by the individual passive radial permanent magnet magnetic bearings. Unstable tilting moments generated by passive magnetic bearings in full levitation magnetic bearing systems are reduced or eliminated by constructing the passive permanent magnet magnetic bearings so that they are concave toward the center of the rotor. The magnetic bearings are preferably curved or positioned piecewise on a curved surface with a radius approximately equal to the distance between the magnetic bearing and the central point about which tilt rotation would tend to occur. To maximize the radial stiffness and load capacity, the individual magnetic air gaps are preferably constructed to be perpendicular to the axis of rotation. Generation of detrimental unstable tilting moments is reduced or eliminated because, in this configuration, the magnetic bearing air gaps do not change significantly when the rotor is tilted with respect to the magnetic bearing stator portions. Hence, no change in the stored magnetic energy occurs due to tilting and no unstable moments are generated. Because the radial bearings at each end of the levitated body do not need to overcome unstable tilting moments from the opposite bearings, the fully levitated rotor system achieves increased radial stiffness and radial load capacity. The permanent magnet radial bearings can be made smaller, the tolerable tilt angle of installation for vertical axis systems can be increased and axially shorter as well as heavier rotors can also be stably levitated.

DESCRIPTION OF THE DRAWINGS

The invention and its many attendant features and benefits will become better understood upon reading the description of the preferred embodiments in conjunction with the following drawings, wherein.

DESCRIPTION OF THE PREFERRED EMBODIMENTS

Figure 1:
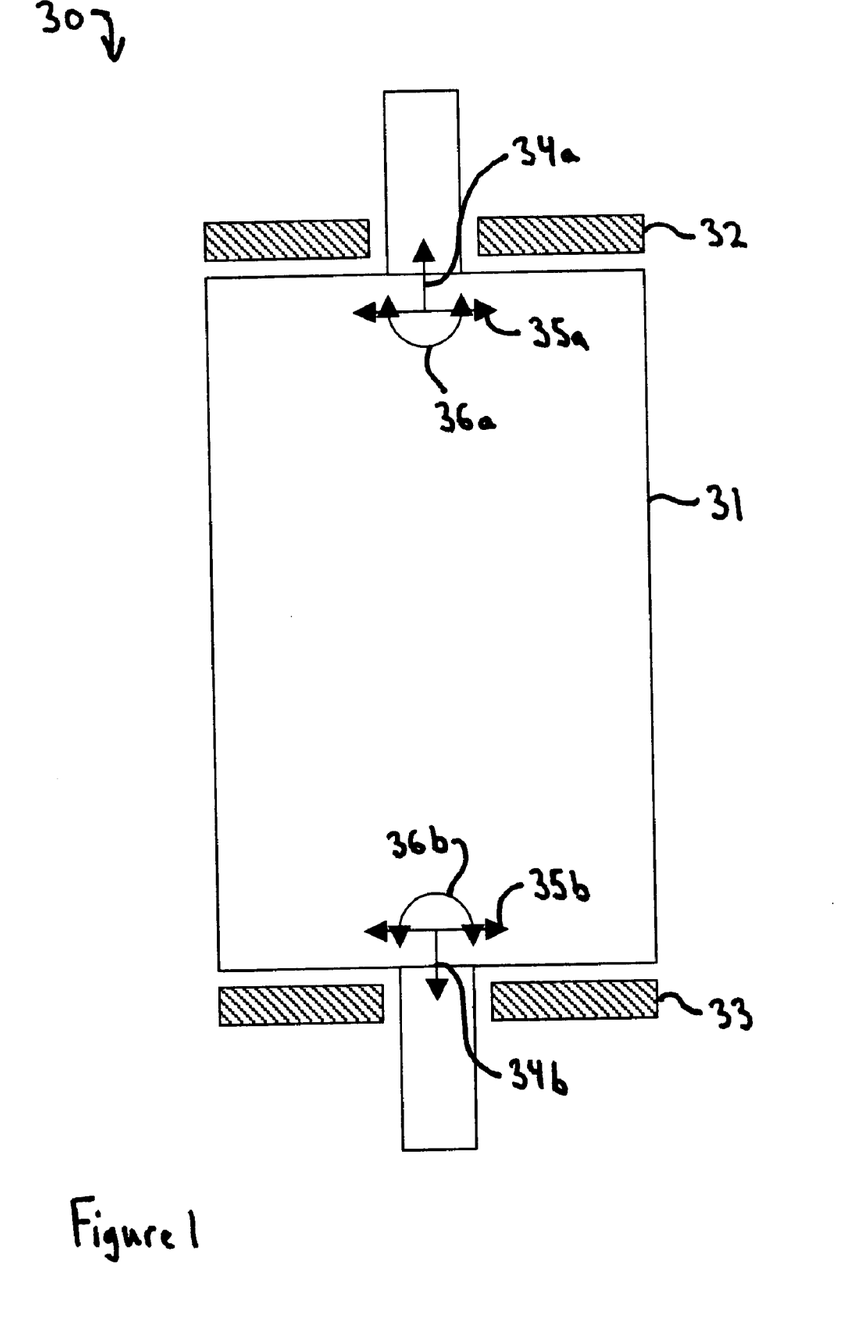
FIG. 1 is a representative drawing of a full levitation magnetic bearing system with passive radial magnetic bearings.

Turning to the drawings, wherein like reference characters designate identical or corresponding parts, and more particularly to FIG. 1 thereof, a representation of a full levitation magnetic bearing system is shown with passive radial magnetic bearings. The magnetic bearing system 30 is comprised of a rotor 31 and passive radial magnetic bearings 32 and 32 located at opposite ends of the center of mass of the rotor 31. The passive radial magnetic bearings 32, 33 provide passive radial centering forces 35a, 35b to the rotor 31, and each generate passive axial unstable forces 34a and 34b. The axial unstable forces 34a, 34b are overcome to maintain full stable axial levitation by a conventional active control system and active axial magnetic bearing, not illustrated. Unfortunately, the passive magnetic bearings 32, 33 also generate unstable tilting moments 36a, 36b. These tilting moments 36a, 36b are not overcome by axial control. The tilting moments 36a, 36b must be overcome by the radial centering forces 35a, 35b at the opposing ends of the rotor 31. Therefore, the unstable tilting moments 36a, 36b reduce the radial force capability and stiffnesses in a fully levitated system 30. In some cases, the unstable tilting moments 36a, 36b can also prevent achievement of full levitation, especially when the rotor 31 has a short axial length.

Figure 2:
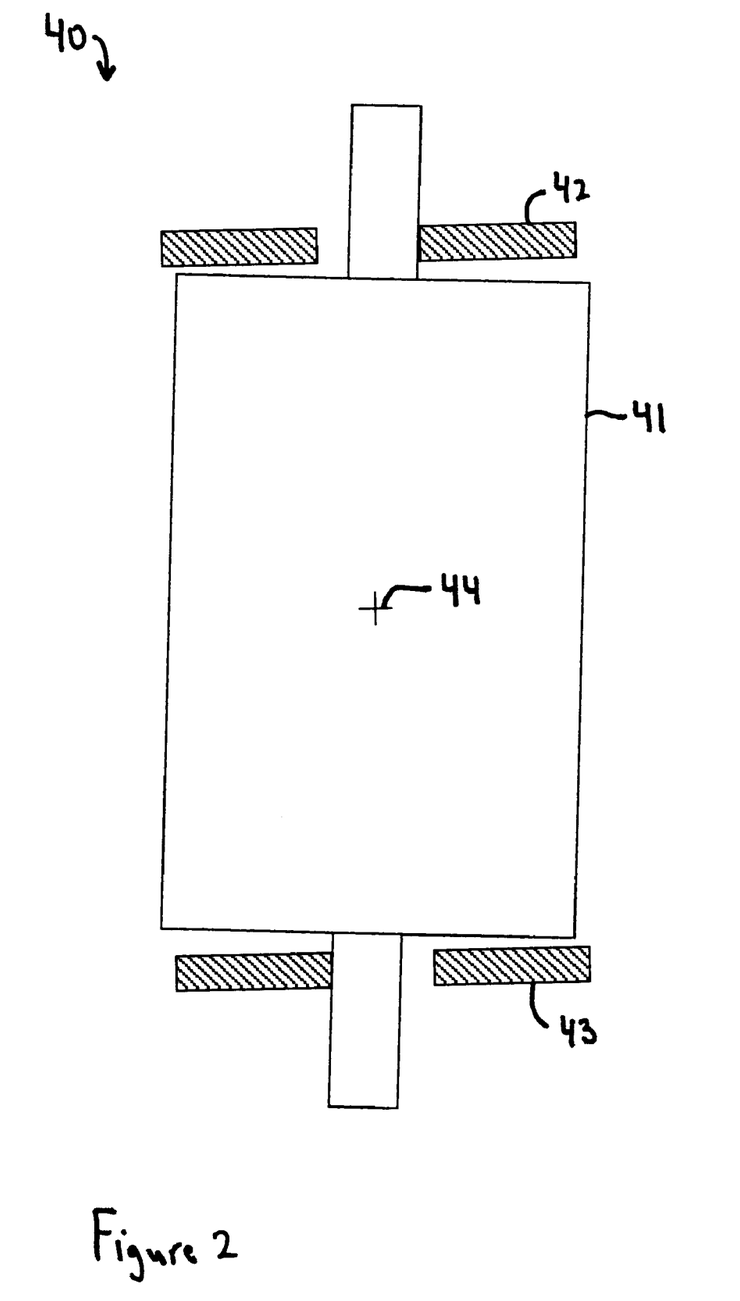
FIG. 2 is a representative drawing of a full magnetic bearing system with passive radial magnetic bearings showing the tilt moment instability tendency.

A representation of full magnetic bearing system with passive radial magnetic bearings showing the tilt moment instability tendency is illustrated in FIG. 2. The magnetic bearing system 40 comprises a rotor 41 and passive radial magnetic bearings 42 and 43. The axial position of the rotor 41 is stably maintained by an active axial magnetic bearing, which has been omitted from the drawing for simplicity. Many types of active axial magnetic bearings are known in the art and could be used with the invention. As shown, the rotor 41 is unstable in the tilting axes. The rotor 41 will then have a tendency to tilt such that the air gaps between the rotor 41 and the magnetic bearings 42 and 43 will not stay uniform around the rotor circumference. The cause of the instability has been found to be that any tilting of the rotor 41 results in change in the dimensions of the magnetic bearing air gaps and a decrease in the stored magnetic energy of the total magnetic bearing system 40 when the rotor 41 tilts. This is a state of lower energy and hence the rotor 41 will have a tendency to be tilt unstable.

If both bearings 42, 43 each posses the same radial stiffness, the rotor 41 will tilt approximately about the point of the center of mass 44 of the rotor 41. The larger the diameter of the magnetic bearings 42 and 43 are, or the higher the stiffness, the greater the unstable tilt moments will be that are generated by the individual bearings 42, 43.

To counteract this tilt instability and achieve stable levitation, conventional magnetic bearing systems require sufficient radial stiffness and load capacity in the opposing end passive radial magnetic bearings, and a sufficient distance between the bearings. The radial stiffness multiplied by the distance between the bearings produces a stable tilt moment from which the unstable tilting moment of an individual magnetic bearing is subtracted. However, this method to achieve full levitation stability with passive permanent magnet magnetic bearings is not always possible or desirable. In some cases, it is desirable to use large diameter or high force axial and passive radial magnetic bearings. Sometimes it is also desirable to levitate axially short rotors with a small distance between the magnetic bearings. Even in configurations where stability can be achieved, the unstable tilt moments generated by the magnetic bearings reduces the overall radial stiffness and load capacity of the magnetic bearing system. For vertical axis systems, the allowable angle of tilt acceptable for installation can be significantly reduced by the unstable tilt moments built into the systems that have to be overcome. If the unstable tilt moments of passive radial magnetic bearings can be reduced or even eliminated, the cost of the magnetic bearing system could potentially be reduced as less radial stiffness would be required to achieve stability.

Figure 3:
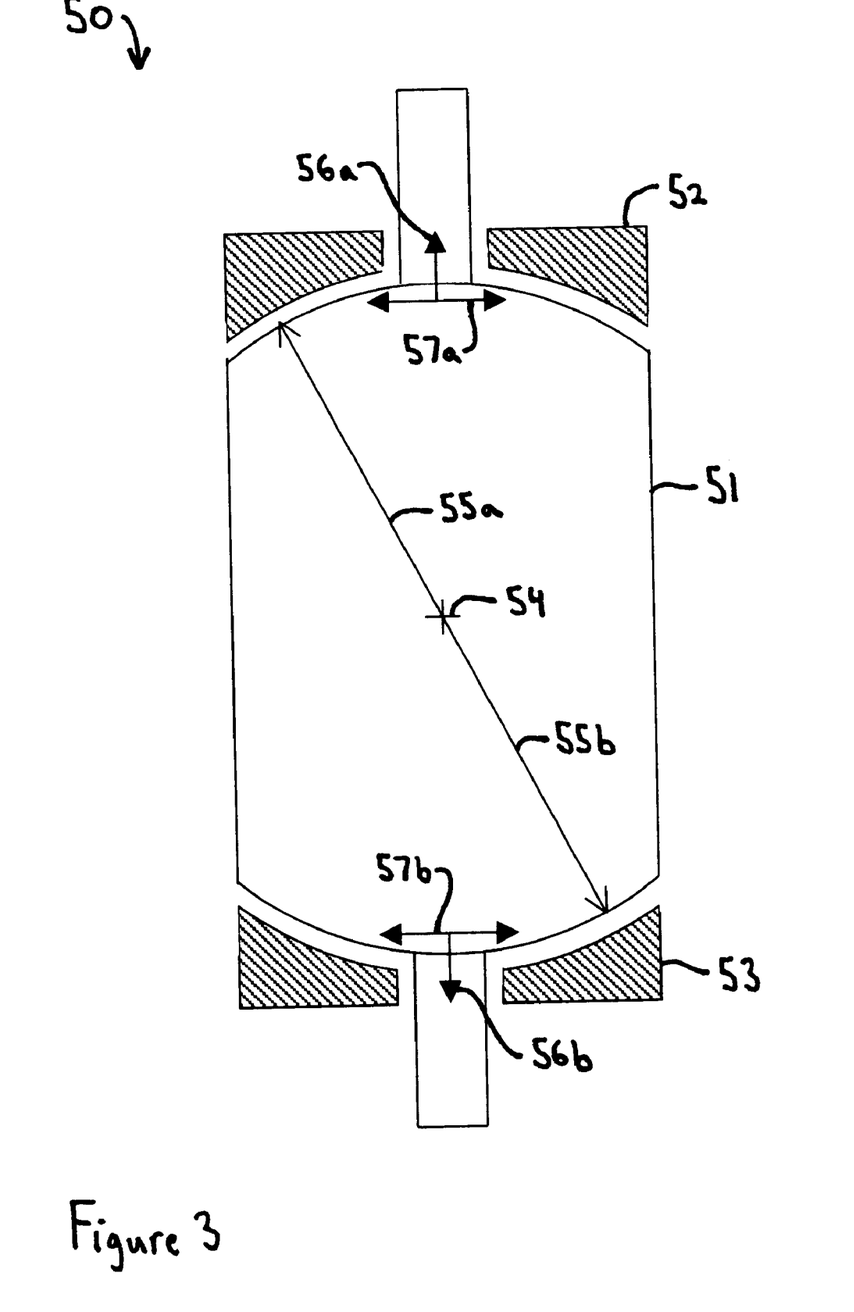
FIG. 3 is a representative drawing of a full levitation magnetic bearing system with passive radial magnetic bearings in accordance with the invention.

A representation of a full levitation magnetic bearing system with passive radial magnetic bearings in accordance with the invention is shown in FIG. 3. The magnetic bearing system 50 comprises a rotor 51 and two passive radial permanent magnet magnetic bearings 52 and 53, located at opposite ends of the center of mass of the rotor 51. These bearings are represented simply for clarity of illustration; in practice, they would typically be formed of multiple concentric magnetic rings on the stator and matching multiple concentric annular poles on the rotor. Again, the active axial magnetic bearing and control electronics are omitted for simplicity of illustrating the invention.

The magnetic bearing system 50 reduces or eliminates the generation of unstable tilting moments, which otherwise would be produced by the magnetic bearings, by arranging the upper and lower magnetic bearings 52 and 53 on concave surfaces. The radii of curvature 55a, 55b of the concave surfaces preferably are equal to the distance between the mass center 54 of the rotor 51 and the upper and lower magnetic bearings 52, 53. Generation of unstable tilt moments is eliminated because as the rotor 51 tilts, the air gaps of the magnetic bearings 52 and 53 do not change. No change in the stored magnetic energy occurs, and therefore no tendency to tilt is produced. The passive magnetic bearings 52 and 53 therefore produce only axial forces 56a, 56b and passive radial centering forces 57a and 57b, and the fully levitated system 50 has an increased radial stiffness and load capacity.

Depending on the ratio of stiffnesses between the permanent magnetic bearings 52, 53 and the location of the center of mass, the radii 55a and 55b can be adjusted. For increased radial stiffness during rotation of the rotor 51, the radii can emanate from the centroid of the transverse moment of inertia rather than the point of the center of mass 54, when different. The magnetic bearings 52 and 53 need not have an exact radial curvature to be effective. Substantial benefits are achieved by simply employing a generally concave permanent magnet bearing structure, using permanent magnet passive magnetic bearing structures arranged to approximate a concave radial curvature for maximum benefit, as is further explained in the following descriptions.

Figure 4:
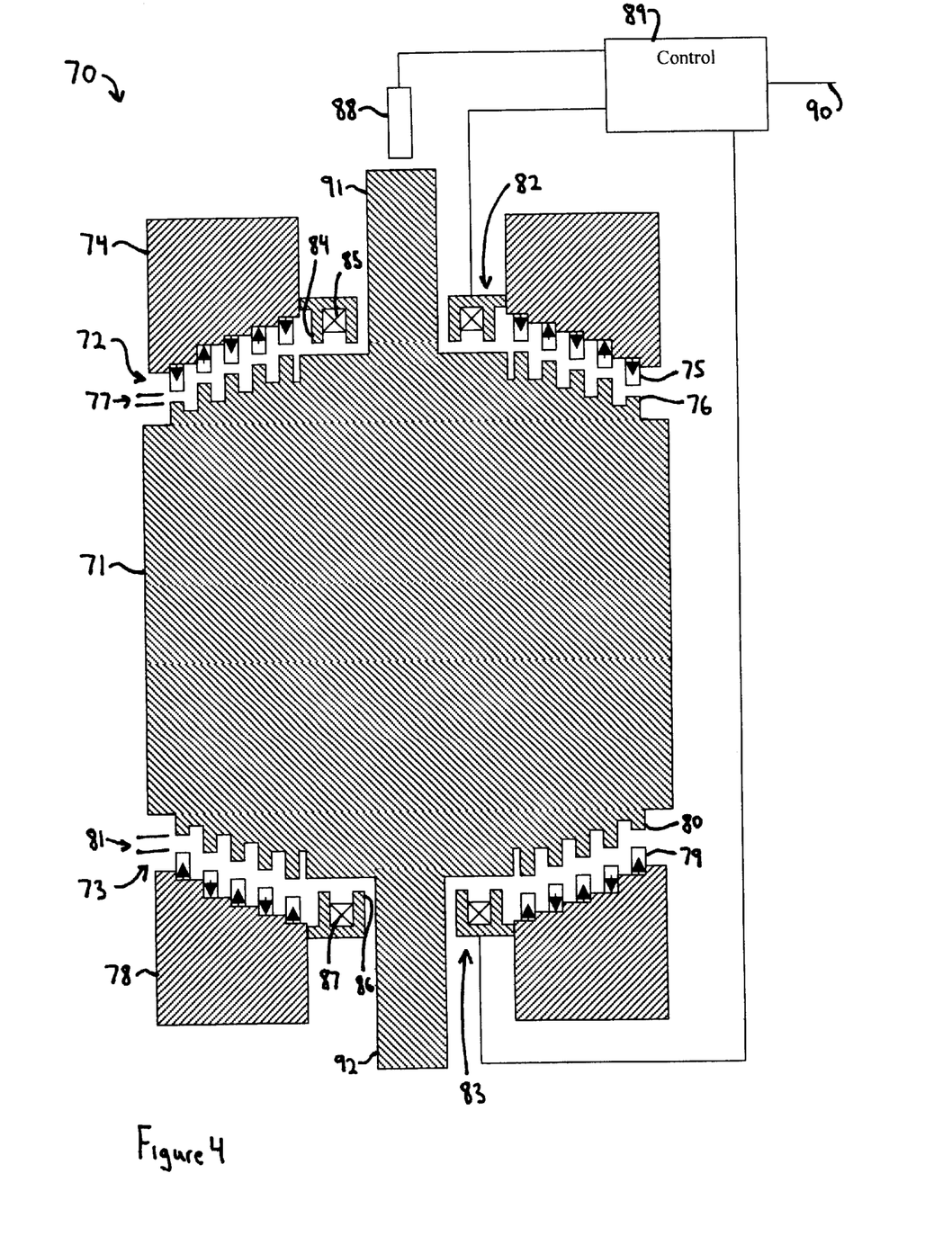
FIG. 4 is a schematic drawing of a full levitation magnetic bearing system with passive radial magnetic bearings in accordance with the invention.

A full levitation magnetic bearing system 70 with passive magnetic bearings 72 and 73 in accordance with the invention is shown in FIG. 4. The magnetic bearing system 70 stably levitates a rotor 71 with passive radial centering and high radial stiffness and load capability. The rotor 71 is levitated by the magnetic bearings 72 and 73, which are located on opposite ends of the center of mass of the rotor 71. The rotor 71 may have shafts 91, 92 extending past the magnetic bearings 72, 73 or the magnetic bearings 72, 73 can be located on the ends of the shafts 91, 92, depending on the desired system configuration. The system 70 is axially stabilized using an active axial magnetic bearing 82, 83. In the configuration of the invention shown, the passive magnetic bearings 72, 73 comprise multiple concentric radially spaced apart alternating polarity ring magnets 75, 79 that are attached to bearing stator portions 74, 78. The ring magnets 75, 79 axially attract and tend to radially align with ferromagnetic pole rings 76, 80 located on the ends of the rotor 71. The axially facing surfaces of the magnetic bearings 72, 73 define axial air gaps 77 and 81.

The radial stiffness and radial load capacity of the magnetic bearing system 70 is increased by making the axially facing surfaces of the ferromagnetic pole rings 76, 80 and the ring magnets 75, 79 lie in or adjacent to a virtual surface defined by a sphere having a radius from the center of the rotor 71 to the air gaps 77, 81, instead of being coplanar. As shown, the actual surfaces of the ring magnets 75, 79 and pole rings 76, 80 are preferably made to lie perpendicular with the axis of rotation so that the individual air gaps between the ferromagnetic pole rings 76, 80 and the ring magnets 75, 79 remain axial. Although the surfaces of the magnet rings 75, 79 and pole rings 76, 80 would effectively remove tilt moment instability if they were curved, having angled surface would result in angled magnetic air gaps that would cause in a reduction of the radial stiffness. Therefore, the magnetic bearings 72, 73 preferably have stepped piecewise axial surfaces, which together approximate a concave surface. The unstable tilt moments generated by a single magnetic ring 75, 79 and pole ring 76, 80 pair are not eliminated, however the unstable tilt moment generated by the complete magnetic bearings 72, 73 is drastically reduced. Having flat axially facing surfaces on the ferromagnetic pole rings 76, 80 and the ring magnets 75, 79 can also have the benefit of simpler construction for some designs of passive radial permanent magnet bearings. The combination of the passive radial magnetic bearings 72, 73 results in both radial stability and tilt stability with axial instability.

The active axial magnetic bearing 82 and 83 provides a simple method for achieving axial stability. The active axial magnetic bearing 82, 83 is electrically operated with feedback and can be constructed very simply for low costs and reliable operation. Many designs of active axial magnetic bearings are known and could be used with the invention to achieve stable levitation. The active axial magnetic bearing 82, 83 shown has axial poles 84 and 86 that generate axial forces with the rotor 71 by selectively and controllably energizing coils 85 and 87. The coils 85, 87 are driven by electronic control 89 that utilizes a position or velocity sensor 88 and low external power 90.

Figure 5:
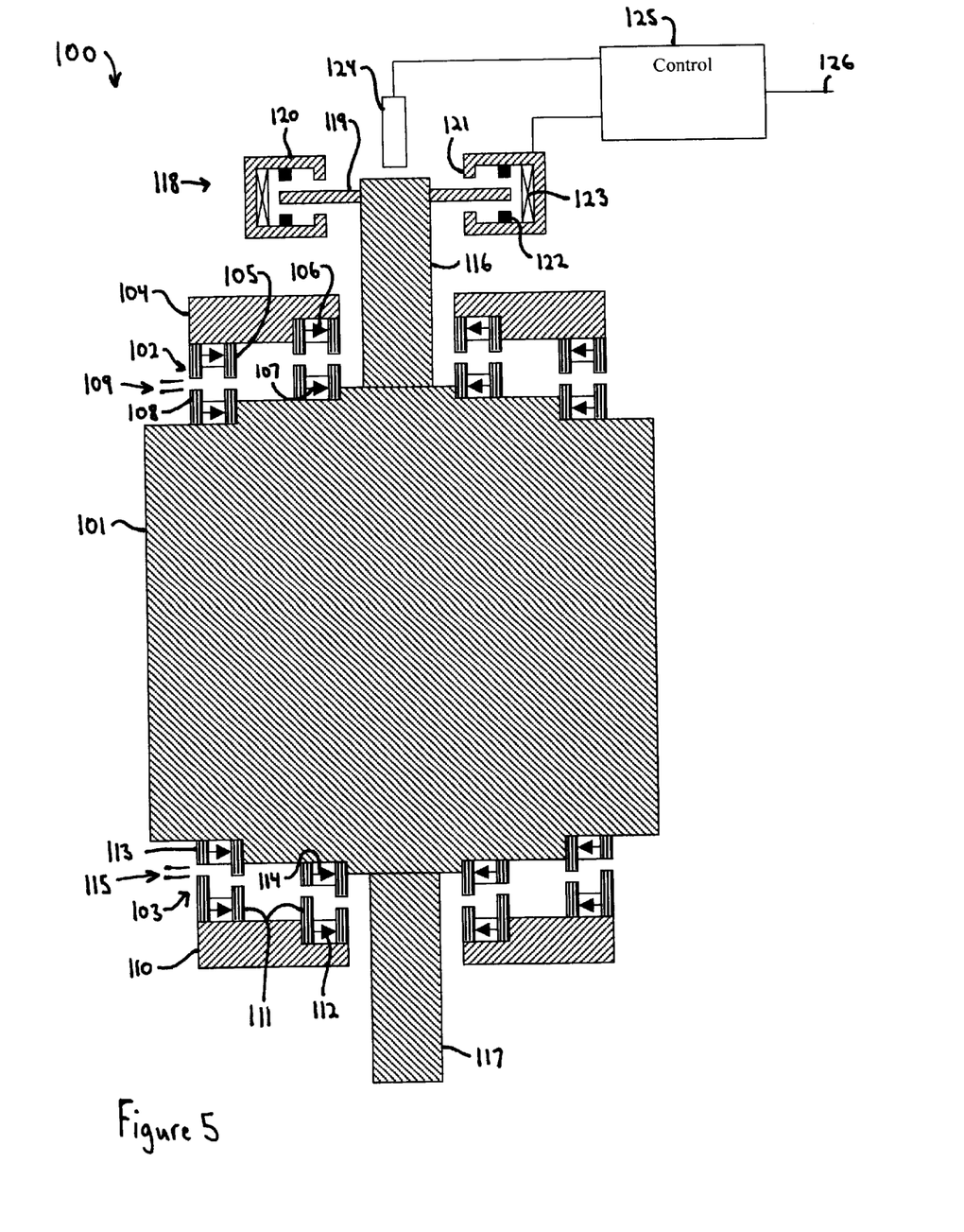
FIG. 5 is a schematic drawing of an alternate configuration full levitation magnetic bearing system with passive radial magnetic bearings in accordance with the invention.

An alternate configuration full levitation magnetic bearing system 100 with passive magnetic bearings in accordance with the invention is shown in FIG. 5. The system 100 shows both a different type of passive permanent magnet magnetic bearings and a different active axial magnetic bearing for stabilization. The bearing system 100 comprises a rotor 101 with passive permanent magnet bearings 102, 103 located on oppose end of the rotor 101, or top and bottom as illustrated. The passive magnetic bearings 102, 103 are constructed from radially magnetized magnets 106, 107, 112, 114, each arranged in an annulus as individual magnets or as annular sectors or a complete annulus, and are located on both the magnetic bearing stator portions 104, 110 and also on the rotor 101. The annular magnets or magnet arrays 106, 107, 112, 114 are each placed between ferromagnetic poles 105, 108, 111, 113 to direct and concentrate the flux axially across axial air gaps 109, 115. The result is generation of axial levitation forces and radial centering forces in the magnetic bearings 102, 103. To prevent magnetic shorting of the magnets 106, 107, 112, 114, the bearing stator portions 104, 110 and rotor 101 are preferably constructed of non-ferromagnetic material. Alternatively, magnetic insulators, not shown, could be used to prevent magnetic shorting.

In accordance with the invention, the ferromagnetic poles 105, 108, 111, 113 of the magnetic bearings 102, 103 have axially facing surfaces that define the magnetic air gaps 109, 115 and that are arranged on or adjacent to virtual surfaces that are concave about the center of mass the rotor 101. As in the embodiment of FIG. 4, the air gaps 109, 115 are preferably axial to prevent loss of radial stiffness in an individual bearing. The axially facing surfaces of the pole rings 105, 108, 111, 113 therefore are preferably flat. As illustrated at the top bearing 102, the concaving of the surfaces defining the air gaps 109, 115 can use equal height pole rings 105 and 108 with individual magnets 106, 107. Alternatively, as shown in the bottom bearing 103, the pole rings 111, 113 can have different heights with individual magnets 112, 114 for even more reduction of unstable tilting moments.

The axial stability of the magnetic bearing system 100 is provided by an active axial magnetic bearing 118 that is attached to either of the shaft 116, 117. The active magnetic bearing 118 has permanent magnet bias for achieving high axial force and linear response. The active magnetic bearing 118 uses a ferromagnetic thrust disk 119 that is attached to the shaft 116. The thrust disk 119 is acted upon by a ferromagnetic bearing stator yoke 120, having poles 121 for conducting flux to and from the thrust disk 119. Permanent magnets 122 provide bias flux and a control coil 123 provides axial force control. The control coil 123 is driven by electronic control 125 that uses a position or velocity feedback 124 and external power conducted via a line 126. The external power can be made to be very small if desired, by operating the magnetic bearing system 100 the rotor 101 positioned in a state of quasi-stable equilibrium where the active magnetic bearing 118 is only required to provide little stabilizing force.

Figure 6:
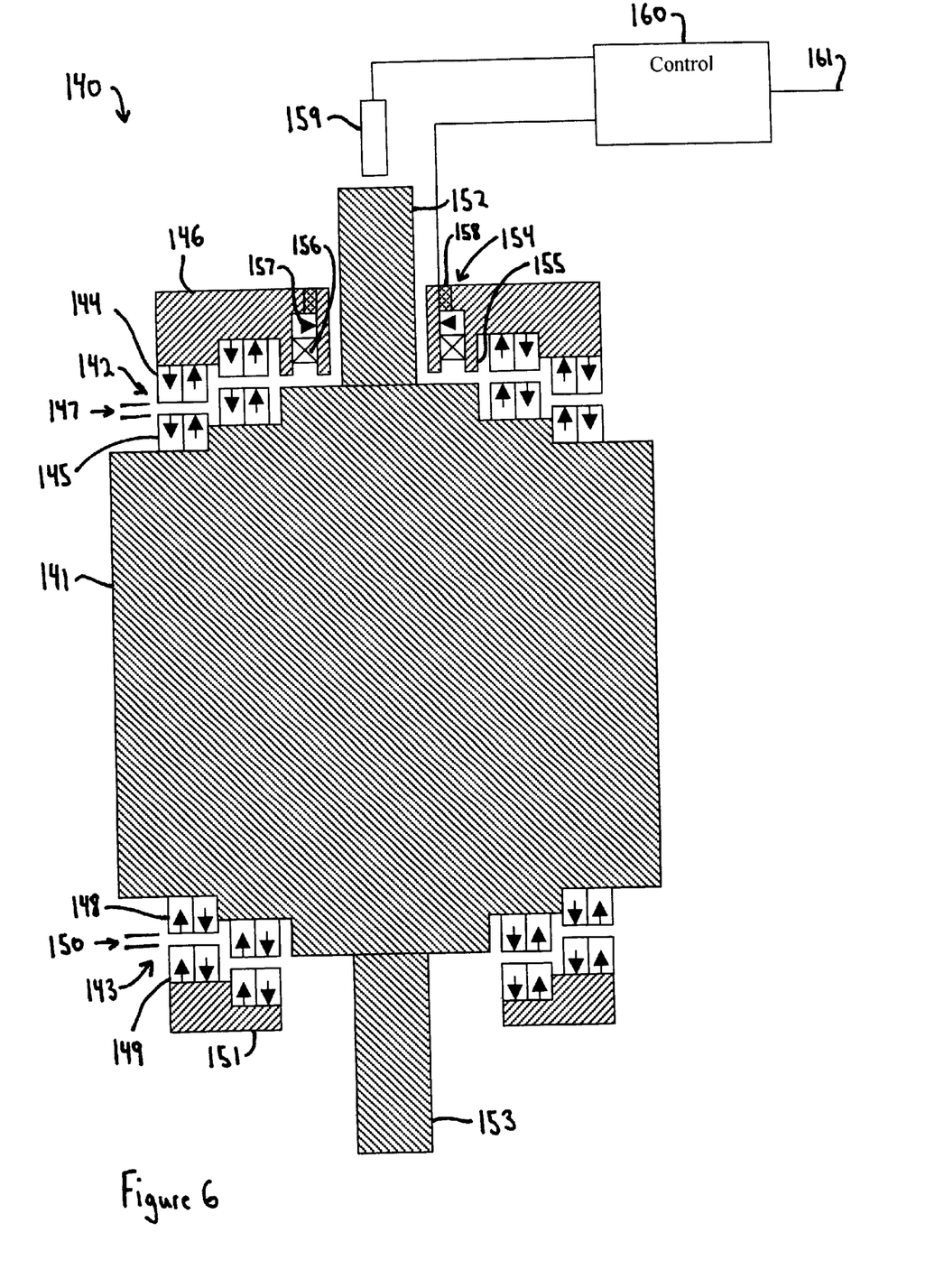
FIG. 6 is a schematic drawing of a second alternate configuration full levitation magnetic bearing system with passive radial magnetic bearings in accordance with the invention.

A second alternate configuration full levitation magnetic bearing system 140 with passive magnetic bearings in accordance with the invention is shown in FIG. 6. The magnetic bearing system 140 is comprised of a rotor 141 and two passive magnetic bearings 142, 143 positioned on opposite ends of the center of mass or centroid of the transverse moment of inertia of the rotor 141. This configuration shows both different passive permanent magnet bearings and a different active axial magnetic bearing. Use of either is not exclusive to this configuration and each could be used in other configurations of the invention. The passive magnetic bearings 142, 143 are constructed of multiple concentric nested axially magnetized ring magnets 144, 145, 148, 149 that are attached to the magnetic bearing stator 146, 151 and to the rotor 141. The ring magnets 144, 145, 148, 149 generate axial forces and also radial centering forces, as they tend to align across axial magnetic air gaps 147, 148, defined by the axially facing surfaces of the magnets 144, 145, 148, 149.

In accordance with the invention, the axial air gaps 147, 148 approximate a partial concave spherical virtual space having a center of curvature at the rotor 141. The axial surfaces of the ring magnets 144, 145, 148, 149 are preferably perpendicular to the axis of rotation of the rotor 141 to maximize the radial centering forces in the individual bearings 142, 143.

To maintain axial stability for full levitation, an active axial magnetic bearing 154 is employed. The active magnetic bearing shown has ferromagnetic poles 155 that act on the ferromagnetic rotor 141 or portion of the rotor. A permanent annular magnet 157 provides a bias flux for both linearization and amplification of the control. A magnetic insulator 158 prevents total shorting of the flux from the permanent magnet 157. A control coil 156 provides axial force control through use of control electronics 160 and a position sensor 159 powered by external power conducted via wires 161. Some designs of active magnetic bearings can also operate in a self-sensing mode where they are used to generate their own position or velocity feedback. This type of active axial control could also be used with the invention.

The magnetic bearing system configuration has uses in many applications including flywheel energy storage devices, motors, generators, pumps, turbines, etc and any device that employs full levitation magnetic bearing systems with passive permanent magnet bearings. Flywheel energy storage devices are one very promising application because they are required to operate reliably and continuously at high speed for years. In many flywheel devices, the costs of construction are of considerable concern so obtaining increased stiffness and load capacity from lower cost magnetic bearings is of interest. Further, the large mass of flywheel devices that store significant energy can result in significant radial bearing loads if installation is not very close to vertical. Other radial loads experience by flywheel energy storage devices include transition through critical speeds and external applied loads such as earthquakes.

Figure 7:
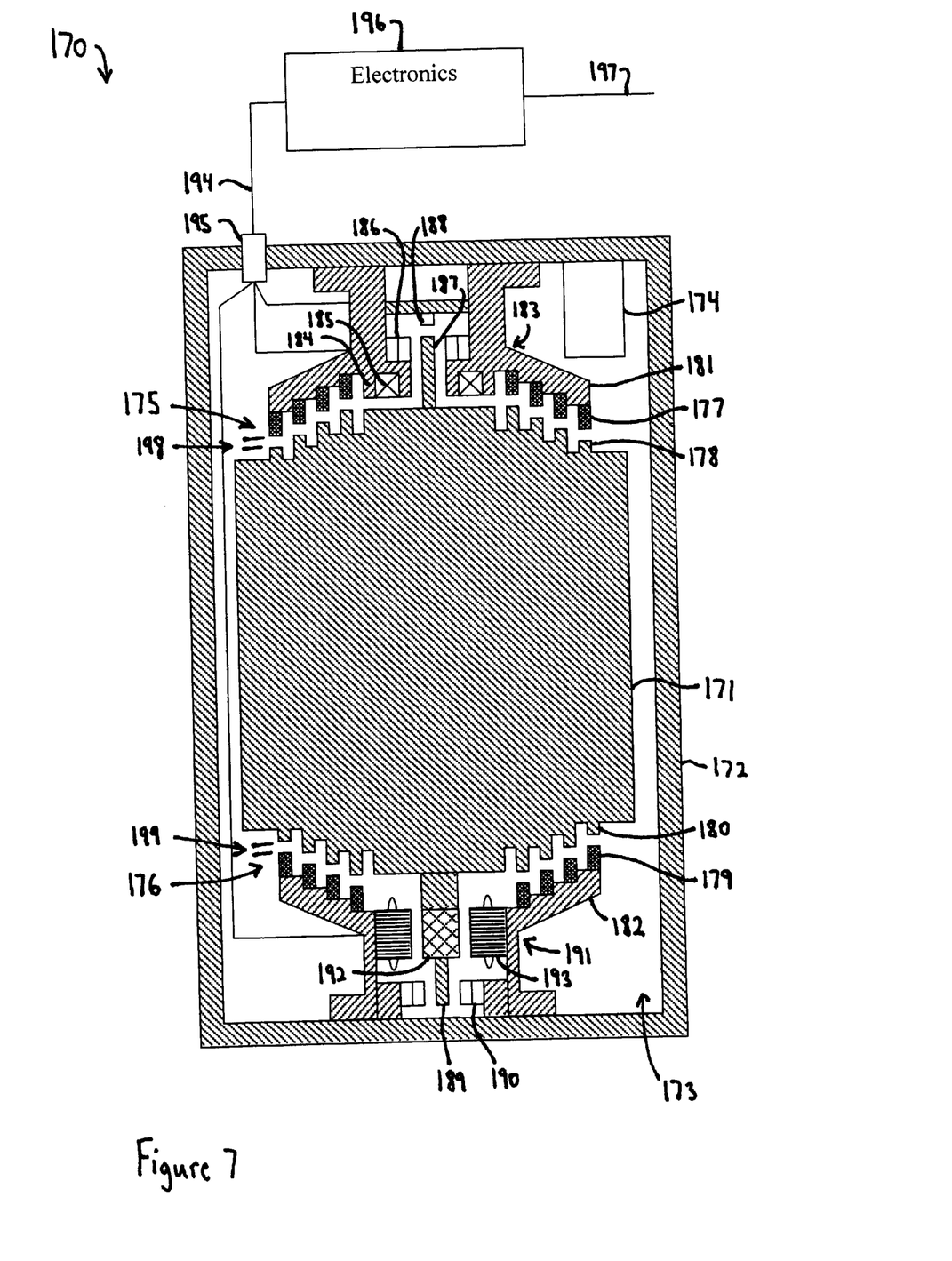
FIG. 7 is a schematic drawing of a flywheel energy storage device having a full levitation magnetic bearing system with passive radial magnetic bearings in accordance with the invention.

A flywheel energy storage device 170 having a full levitation magnetic bearing system with passive magnetic bearings in accordance with the invention is shown in FIG. 7. The flywheel system 170 is constructed of a high speed flywheel 171 that rotates inside an evacuated chamber 173 within a container 172 for reduction of aerodynamic drag. The vacuum in the chamber 173 is preferably maintained for the life of the system 170 through use of a mechanical or sorption type vacuum pump 174. As shown, the flywheel 171 is constructed of high strength steel for resisting stresses from rotation. The flywheel 171 is magnetically levitated by upper and lower passive radial permanent magnet bearings 175, 176. The passive radial magnetic bearings 175, 176 use multiple concentric radially spaced apart ring magnets 177, 179 that are attached to bearing stators 181, 182. The ring magnets 177, 179 attract ring poles 178, 180 on the faces of the rotor 171 to produce axial forces and radial centering forces across magnetic air gaps 198, 199. In accordance with the invention, the surfaces defining the magnetic air gaps 198, 199 are approximately concave about the center of the flywheel 171 for prevention of significant unstable tilting moments that would reduce the radial stiffness and radial load capacity of the flywheel system 170.

The flywheel 171 is axially stabilized with an active axial magnetic bearing 183 that acts upon the flywheel 171. Many designs of active axial magnetic bearings exist and could be used. The active axial magnetic bearing 183 has ring poles 184 and a control coil 185 for providing axial force control. An axial position sensor 188 acting on the end of the shaft 187 provides feedback to the electronics 196 for axial stabilization. The power for the active magnetic bearing can come from external sources 197 or can be generated from the flywheel system 170 itself. When the active axial magnetic bearing 183 is not operating or the radial load capacity of the passive radial magnetic bearings 175, 176 is exceeded, the flywheel 171 is supported by the shafts 187, 188 contacting auxiliary mechanical bearings 186, 190. The flywheel 171 is accelerated and decelerated for storing and retrieving energy through use of an attached or integral motor/generator 191. Many types of motor/generators exist and could be utilized in flywheel energy storage devices in accordance with the invention. The motor/generator 191, as shown, has a permanent magnet rotor 192 attached to the shaft 189. The permanent magnet rotor 192 is surrounded by a motor/generator stator 193 that provides for energy conversion. The wires 194 from the active magnetic bearing 183, position sensor 188, motor/generator 191 and any other electrical components exit the vacuum 173 through a vacuum tight feedthrough 195.

Figure 8:
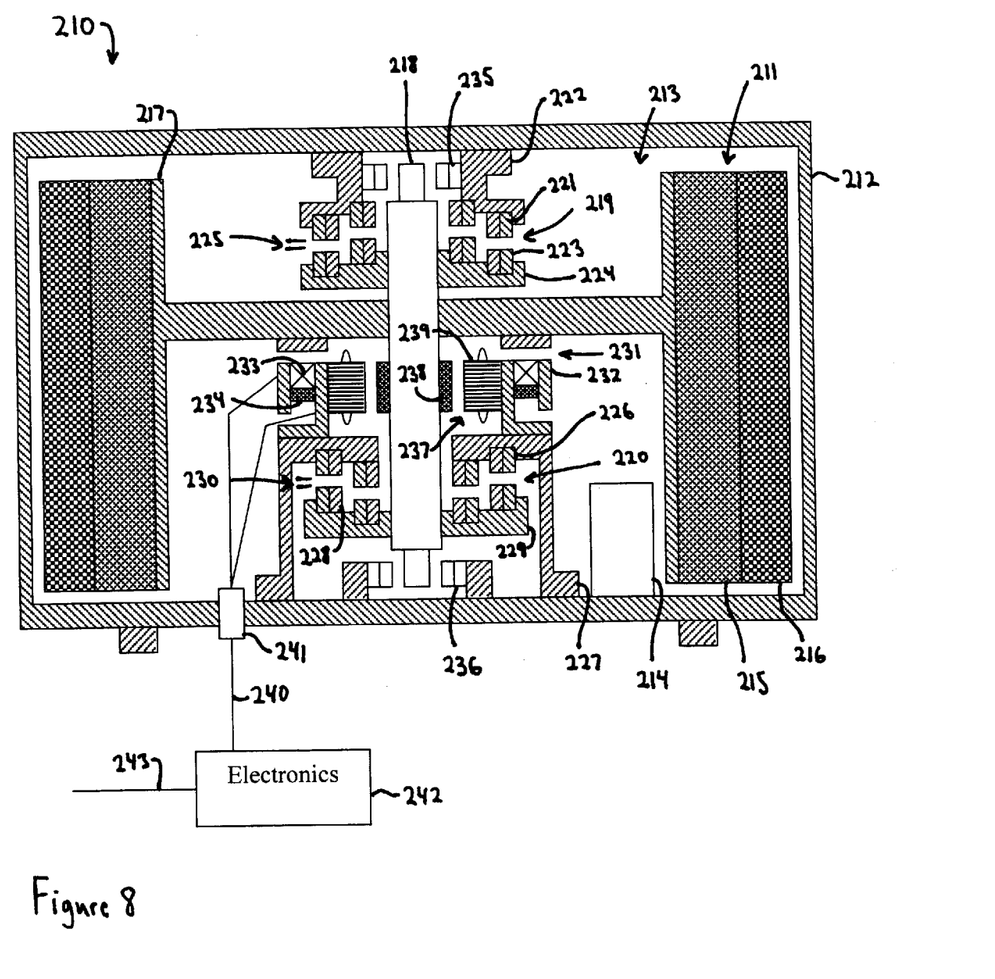
FIG. 8 is a schematic drawing of an alternate configuration flywheel energy storage device having a full levitation magnetic bearing system with passive radial magnetic bearings in accordance with the invention.

The invention is applicable for use in all types of flywheel energy storage devices having steel flywheels or higher speed composite flywheels. An alternate configuration flywheel energy storage device 210 having a full levitation magnetic bearing system with passive magnetic bearings in accordance with the invention is shown in FIG. 8. The flywheel system 210 is comprised of a high-speed composite material flywheel 211 that rotates inside an evacuated chamber 213 within a container 212. The vacuum in the chamber 213 can be maintained by numerous methods including the use of an internal getter pump 214. The composite material flywheel 211 is shown with a layer of hoop wound carbon fiber epoxy 216 outside a layer of hoop wound glass fiber epoxy 215. The flywheel 211 is attached to a central shaft 218 with a high growth hub 217.

The flywheel 211 is magnetically levitated by upper and lower passive permanent magnet bearings 219, 220 that are located above and below the center of mass of the flywheel 211. The passive magnetic bearings 219, 220 use multiple nested concentric magnet rings 223, 228 that are attached to rotor bearing portions 224, 229. Matching sets of ring magnets 221, 226 are attached to bearing stator portions 222, 227 to provide axial force and radial centering force across magnetic air gaps 225, 230. In this design, the bottom passive radial permanent magnet bearing 220 supplies axial force in the same direction as the upper radial magnetic bearing 219. Both radial magnetic bearings 219, 220 lift the weight of the flywheel 211.

In accordance with the invention, the axially facing surfaces of the magnets 221, 223, 226 and 228 define magnetic air gaps 225, 230 that are both on or near a virtual spherical shell that is concave toward the center of mass of the flywheel 211 to dramatically reduce the generation of unstable tilting moments.

The axial position of the flywheel 211 is stabilized by an active axial magnetic bearing 231 that contains ferromagnetic poles 232 that cooperate with the hub 217. A permanent magnet 234 provides bias flux and a control coil 233 provides axial force control. When the active axial magnetic bearing 231 is not operating or the load capacity of the passive radial magnetic bearings 225, 230 has been exceeded, the flywheel 211 is supported by upper and lower mechanical auxiliary bearings 235, 236.

The flywheel 211 is accelerated and decelerated for storing and retrieving energy with a motor/generator 237. The motor/generator 237 comprises a rotor 238 attached to the shaft 218 and is surrounded by a stator 239 for converting between electrical and mechanical energy. Although shown with a radial gap motor/generator 237, axial gap or air core machines can also be used with the further advantage or reduced generation of radial destabilizing forces. Electrical wires 240 from the active magnetic bearing 231, motor/generator 237 or any other internal electrical component exit the vacuum 213 through us of a vacuum tight seal 241. Electronics 242 provide both magnetic bearing control and power conversion for external connections 243.

Obviously, numerous other modifications, combinations and variations of the preferred embodiments described above are possible and will become apparent to those skilled in the art in light of this specification. For example, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species.

Accordingly, it is expressly intended that all these embodiments, species, modifications and variations, and the equivalents thereof, are to be considered within the spirit and scope of the invention as defined in the following claims, wherein I claim:

1. A full levitation magnetic beating system for magnetically suspending a rotor on a stator for rotation about an axis without contact;

said full levitation magnetic bearing system employing passive permanent magnet magnetic bearings on opposing ends of the center of mass of said rotor, said passive permanent magnet magnetic bearings generating both passive radial centering and passive axial forces, said magnetic bearing system also including an active axial magnetic bearing for providing axial stabilization;

each said passive permanent magnet magnetic bearing comprising more than two magnetic pole rings on one of said rotor and said stator, or both said rotor and said stator, and cooperating poles on the other of said rotor and said stator;

magnetic air gaps between said magnetic pole rings and cooperating poles;

said magnetic pole rings and cooperating poles have axially facing surfaces that are perpendicular to said axis;

said axially facing surfaces lying adjacent a virtual spherical shell that is concave about the center of mass of said rotor.

2. A full levitation magnetic bearing system as described in claim 1 wherein:

said rotor comprises a flywheel for a flywheel energy storage system; and said flywheel energy storage system supports said flywheel for rotation about a substantially vertical axis inside a low pressure container and an integral motor/generator means converts between electrical and mechanical energy.

3. A full levitation magnetic bearing system as described in claim 1 wherein:

said passive permanent magnet magnetic bearings comprise a magnetic bearing rotor portion and magnetic bearing portion each constructed of multiple concentric nested axially magnetized ring magnets that tend to radially align thereby generating passive radial centering force.

4. A full levitation magnetic bearing system as described in claim 1 wherein:

said passive permanent magnet magnetic bearings comprise a magnetic bearing rotor portion and magnetic bearing portion each constructed of multiple concentric ferromagnetic ring poles with radially magnetized permanent magnets located between some of said ring poles such that the ferromagnetic ring poles on said magnetic bearing rotor portion and said magnetic bearing stator portion tend to radially align thereby generating passive radial centering force.

5. A full levitation magnetic bearing system as described in claim 1 wherein:

said passive radial type permanent magnet magnetic bearings comprise a magnetic bearing rotor portion and magnetic bearing portion, one of which is constructed of multiple concentric but radially spaced apart axially magnetized ring magnets with alternating polarities, the other of which comprises multiple concentric radially spaced apart ferromagnetic ring poles such that said axially magnetized ring magnets tend to radially align with said ferromagnetic ring poles thereby generating passive radial centering force.

6. A full levitation magnetic bearing system as described in claim 1 wherein:

said surface defined by the loci of magnetic air gaps that is concave about the center of mass of said rotor has an approximate radius equal to the distance between the axial air gap at the centerline of said rotor and the center of mass of said rotor.

7. A full levitation magnetic bearing system as described in claim 1 wherein:

said surface defined by the loci of magnetic air gaps that has a concave radius about the center of mass of said rotor, said radius being approximately equal to the distance between the axial air gap at the centerline of said rotor and the centroid of the transverse moment of inertia.

8. A process for suspending a massive cylindrical flywheel, having a center of mass and a central axis through said center of mass, for rotation about a vertical axis that is coincident with said central axis, comprising:

generating both passive radial centering and passive axial forces and an active axial magnetic bearing for providing stabilization with full levitation magnetic bearing system employing passive radical type permanent magnet magnetic bearings on opposing ends of the center of mass of said rotor;

said axial forces generated by magnetic flux emanating from axially facing surfaces of permanent magnets;

said axially facing surfaces defining together a spherical air gap that is concave toward said center of mass.

* * * * *